M. ATWOOD.
Seed-Planter.
No 1,188.
Patented June 24, 1839.
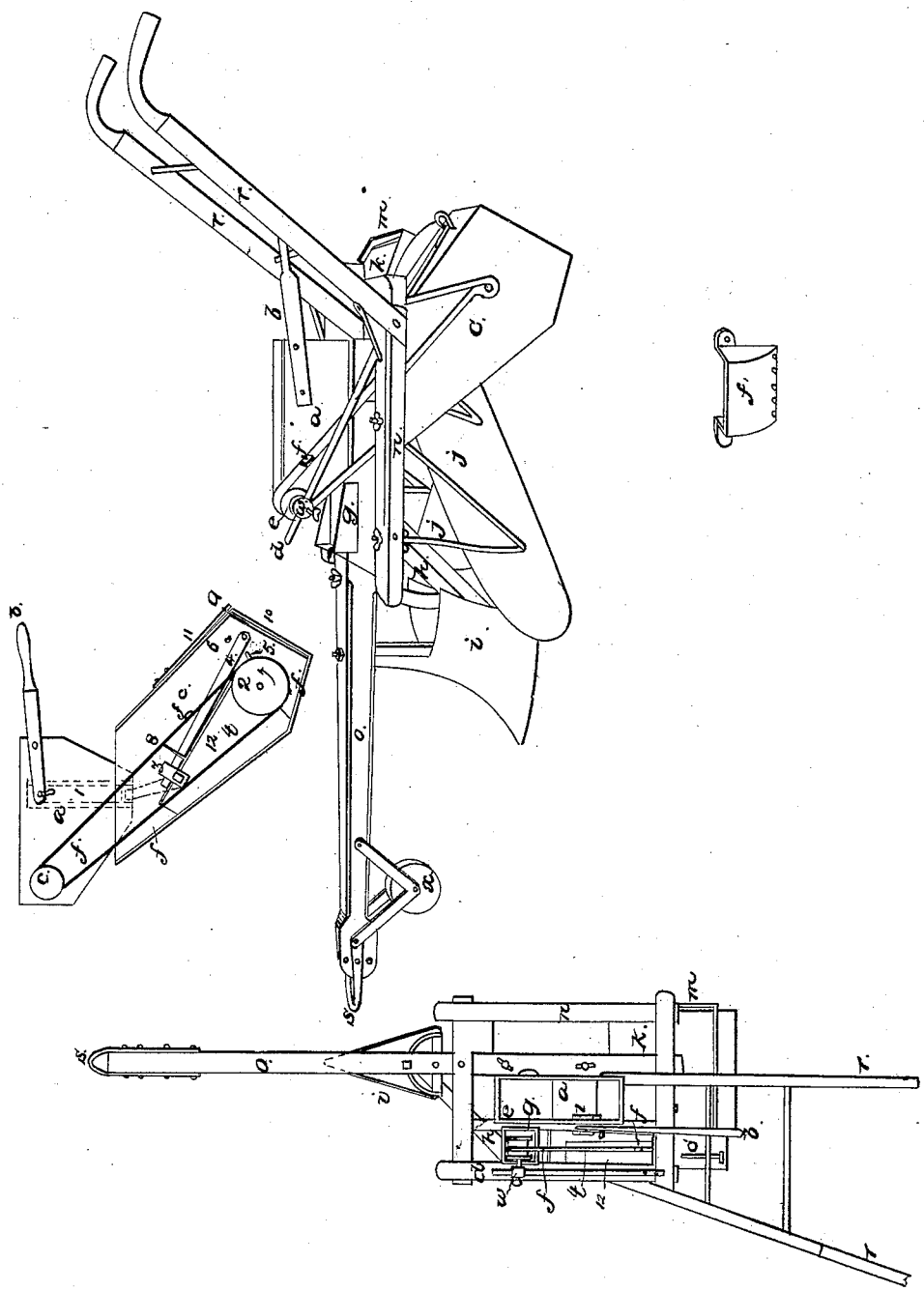

UNITED STATES PATENT OFFICE.

MOSES ATWOOD, JR., OF HAMPSTEAD, NEW HAMPSHIRE.

IMPROVEMENT IN PLANTING-MACHINES.

Specification forming part of Letters Patent No. 1,188, dated June 24, 1839.

*To all whom it may concern:*

Be it known that I, MOSES ATWOOD, Jr., of Hampstead, in the county of Rockingham and State of New Hampshire, have invented a new and useful Machine for Planting Corn or Beans; and I do hereby declare that the following is a full and exact description.

The nature of my invention consists in having a square frame made of wood, n, to support the whole machine, as represented in the bird's-eye view and perspective drawings, to which, in the usual way, a beam, o, is fixed to enable the cattle to draw it, and also the handles r r to guide it.

On the top of the frame n a hopper or box, a, is fixed. In this box the corn or beans to be planted are put in the first place. (The same letters or figures refer to the same parts in all the drawings where the same parts can be seen ) If the drawing of the interior of the hopper a and pulley-box c be examined a small square hole marked z will be seen in the side of the hopper close to the bottom of it. (It is shadowed with india-ink, that it may be easier perceived.) Now, if the lever b is depressed by the hand, the slide or shuttle 1, which is connected with the lever, will be raised and a communication will be established from the square hole z, provided a short spout, as represented in shadow, leads from z to another small square hole pierced through the side of the pulley-box c, which hole is covered by the shuttle or slide 3. This last-mentioned hole does not open into the part marked 12 in the pulley-box, (that part being partitioned off for the bucket-belt t to work in, which will presently be described,) but it passes merely through the side of the pulley-box, so that, when opened, the corn or beans would trickle down from it in the space between the side of the pulley-box and the partition 12 until it would arrive under the pulley 2.

The pulley 2 is on the same axis with the roller k at the hind part of the machine, and of course turns round with it in the direction shown by the arrow marked on the pulley. The bucket-belt (see interior of hopper and pulley-box c) passes under the pulley 2 and over the upper one, e, which last is capable of being adjusted or sliding with its slide-box w on the bar d, (see perspective view and bird's-eye view,) and this is held in its place by a thumb-screw, so as to lengthen or tighten or shorten the belt, as occasion may require. On the face of this belt small buckets f are attached or tied at intervals, or so far apart as will regulate the distance the hills of corn or beans are intended to be planted from each other. (One of the buckets is represented on a larger scale at f.)

On the edge of the pulley 2 a small pin or cam, 5, is fixed, which every time the pulley revolves will lift the lever 4, and of course the shuttle 3 attached to it, and so open the aperture for the supply of corn or beans to trickle down to the under side of the pulley 2. Now, as the bucket-belt travels under the pulley 2, the buckets, which are attached to the belt, will in succession scoop up some corn and carry it to the pulley e, where, as the belt passes over it, the buckets will be emptied of their contents into the hopper g, and through the spout h it will be conveyed to the ground in the rear of the plowshare i. Note that the lever 4 is held down by a spring, 6, and steadied in its motion by passing under a staple, 8; and, also, that the shuttle 3 is adjustable on the lever 4 and is held in its place by a screw or otherwise, so that each time the shuttle is lifted the portion of the opening it shall uncover may be graduated, and consequently the quantity of corn or beans it lets down into the pulley-box will be graduated also.

The plowshare is made with a movable nose, (and I prefer to have the whole share of cast-iron,) so that when the share-nose is worn out a new one may be substituted without the necessity of having an entire share cast.

Immediately in the rear of the plowshare and spout h are two plates, j j, placed diagonally with each other. Their use is to throw the soil over the drill in which the corn or beans have been deposited, and also to throw out any loose stones which may be in or on the soil into the rows between the hills. (The diagonal plates are not shown in the bird's-eye view.)

At the back part of the machine is a roller, marked k, which passes over the drills and presses the soil down on the corn, and it has a scraper, m, attached to the frame n, so that when the soil is damp and sticks to the roller it will be scraped off.

The plates j j are adjustable by means of screws holding them to the frame n, and they can be raised or lowered, as occasion may require, (as is shown in the drawings,) and their braces are also capable of sliding with them at the same time, as they have slits at their top ends under the frame, and are also held in their places by screws.

The spout $h$, connected with the small hopper $g$, can be adjusted according to the length of the bucket-belt used, as the spout is movable, being held near its lower end by a short rod with an eye at the bottom, swinging in a slit in the spout, and also by a staple attached to the under side of the beam $o$, passing through an eye at the top of the short rod.

The frame $n$ has several holes through it to suit different distances for this hopper to be placed at, and it is secured by a pin. (See drawing.)

On the top and back part of the pulley-box $c$ is a ring or handle, 9, attached to a shuttle, 10, which is held down by a spring, 11, outside the pulley-box $c$; but it may be raised when it is desirable to empty the corn or beans out of the box.

At the end of the beam $o$ is a small wheel or roller, $x$, held by straps. It is intended to prevent the beam from pitching too low forward; or it will rest on the ground while the machine is turned round at the end of each drill. The cop marked $s$ is held by a pin passing through the two-wheel straps just mentioned and the beam $o$, and may be raised or lowered, so as to incline the plowshare more or less into the ground, as occasion may require, and it is held in its place by a pin or bolt in one or other of the holes made at the end of the beam to receive it.

What I claim as my invention, and desire to secure by Letters Patent, is—

1. The combination of the box $a$, containing the corn to be planted, with the pulley-box $c$, the small hopper $g$, and the adjustable bucket-belt $f$ with its buckets for taking up the corn.

2. In combination with this arrangement, the adjusting-bar $d$, for regulating the length of the bucket-belt, the lever $b$ and slide 1, for regulating the supply of corn to the pulley-box $c$, the lever and slide 3, contained in the pulley-box, for admitting and shutting off the supply of corn to the same, together with the pulleys $e$ and 2 and the cam 5, for lifting the lever 4, so as to admit a supply of corn, &c., into the pulley-box $c$, all substantially as herein described.

MOSES ATWOOD, JR.

Witnesses:
W. DUESBURY,
JOEL ADAMS.